United States Patent

Dattilo

[15] 3,643,016

[45] Feb. 15, 1972

[54] FACSIMILE SYSTEM WITH DATA COMPRESSION BY "WHITE SPACE SKIPPING"

[72] Inventor: Giuseppe A. Dattilo, Manhattan Beach, Calif.

[73] Assignee: The Magnavox Company, Torrance, Calif.

[22] Filed: May 11, 1970

[21] Appl. No.: 36,246

[52] U.S. Cl. ..........178/6, 178/DIG. 3

[51] Int. Cl. ..........H04n 3/00

[58] Field of Search ..........178/DIG. 3, 6, 68

[56] References Cited

UNITED STATES PATENTS

| | | | |
|---|---|---|---|
| 3,445,598 | 5/1969 | Green et al. | 178/6 DIG. 3 |
| 3,428,744 | 2/1969 | Green et al. | 178/6 DIG. 3 |
| 3,402,258 | 9/1968 | Lerner | 178/6 DIG. 3 |
| 3,384,710 | 5/1968 | Doundoulakis | 178/DIG. 3 |

*Primary Examiner*—Robert L. Griffin
*Assistant Examiner*—Barry Leibowitz
*Attorney*—Smyth, Roston & Pavitt

[57] ABSTRACT

A facsimile system with data compression is disclosed according to which the information along a scanning line is divided in data blocks, separated by significant runs of contrastless portions (white). Beginning and end of a data block are identified by address codes developed during a fast search scan for such boundaries, and they are transmitted as control information. Slow facsimile scan is restricted to line portions between data block boundaries, and the receiver moves in synchronism at slow scan rate and reproduces between such boundaries as defined by the previously transmitted addresses. Two methods are disclosed, one thereof alternates between data block boundary detection and transmission thereof followed directly by slow scan transmission of the facsimile data of that block, thereafter fast scan data block detection on the same line is resumed etc. In the other method all of the data block boundaries in an entire line are detected first, next all the addresses thereof are transmitted followed by transmission of all the data in the several blocks.

15 Claims, 5 Drawing Figures

INVENTOR:
Giuseppe A. Dattilo

By Smyth, Roston & Pavitt
ATTORNEYS

INVENTOR:
Giuseppe A. Dattilo

By Smyth, Roston & Pavitt
ATTORNEYS

INVENTOR:
Giuseppe A. Dattilo

By Smyth, Roston & Pavitt

ATTORNEYS

FACSIMILE SYSTEM WITH DATA COMPRESSION BY "WHITE SPACE SKIPPING"

The present invention relates to the art of transmission of facsimile signals and more particularly to method and equipment for condensing or compressing the amount of data to be transmitted. Facsimile transmission of the content of a document, of a data sheet, of a drawing or the like, is conventionally carried out through line for line scannings for covering the scanning area, whereby each line scan is carried out at a particular sweep rate. Data detected during the scan are transmitted analogous to video signal transmission. Thus, the scanning rate is independent from the content of the transmission. It is usually inherent in facsimile operation that the scanning beams runs over large areas of, for example, white paper, i.e., over areas which do not exhibit any contrast, but provide merely background. Nevertheless, the conventional facsimile operation causes these white areas to be transmitted as regular data. Compositioning of a duplicate at the receiver station operates in synchronism with the transmission; there is, for example, line-per-line printout with no printing, i.e., no application of toner, while the scanning beam of the transmitter runs across these white areas.

It is an object of the present invention to reduce the transmission time of facsimile data by providing method and system which eliminates transmission of signals representative of significant areas and portions of the document without any contrast. Data compression for purposes of reducing transmission of noncontrast information has been attempted previously in various ways, but without apparent success.

In accordance with one aspect of the present invention in the preferred embodiment thereof, the scanning area (document to be facsimile transmitted) is subjected to a fast detection process to define areas thereof holding data and separating them from background or "white." The data areas are defined by address signals, and slow data read scan and transmission is restricted to the delineated data areas. In particular, the document or page, i.e., the scanning area, is considered to be divided into elemental image areas or increments, organized in lines with a particular member of such elements per line. An elemental area on a line may have assigned an address and may either be empty space (background) or it may provide contrast relative to the background of the document page; in the following, these different types of elemental areas or image increments are simply called "white" or "black" respectively.

The principle behind the invention is to detect, on each line, the extension of relatively long consecutive runs of "white" image increments, whereby a minimum count of consecutive white elements establishes the criterium for recognizing a length on a line as containing no data. The boundaries of such significant runs of white are also boundaries of data blocks defined as addresses on the line. A data block on a line has "-black," contrasting elemental areas as image increments at its beginning and end and, possibly, some in between; however, a data block may consist of a single "black" dot.

The line scanning procedure is separated in two phases which may follow consecutively or may be provided as interleaved, alternating subphases as will be explained more fully below. The one type of phases is carried out particularly at a faster rate than normal and, possibly, faster than permissible for facsimile transmission. That fast scan searches for relatively long stretches of white defined as a number of consecutive "white" elemental areas in excess of a particular number. The beginning and end points of such long or significant run of "white" are identified by addressing codes on the line, and these codes are stored. The end of one such significant run of white and the beginning of the next one define the boundaries of a data block that contains contrasting, image defining black markings.

The search scan process is not a free running sweep but is carried out in a controlled manner; the position of the scanning beam is changed in between different definite positions which, in turn, can be defined by digital codes. The boundary defining addressing codes of a block are transmitted as separate control information, and the receiver is instructed thereby to subsequently cause printout of contrasting markers in between the relative positions as defined by these addresses only.

The second phase or type of phase involves relatively slow regular data scan for facsimile readout proper and transmission, but the slow data scan is restricted to portions of a line respectively between two boundaries as previously detected.

The process is recreated on the receiver side in that the addresses defining beginning and end of data blocks are separately processed and used to define the boundaries within which the received facsimile data proper are reproduced. On both ends of the system, i.e., in the transmitter as well as in the receiver, slow scan across significant runs of white is avoided.

Basically, two methods are disclosed in the present specification: in accordance with one method a fast scan is conducted on a line to detect the boundaries of the first data block and to establish addresses thereof. Thereupon, the fast scan is stopped and the two addresses are transmitted. Additionally, the scanner retraces and the data in between these two address boundaries are slow scanned and likewise transmitted. Thereafter, the fast search for another data block is resumed, and after detection the addresses thereof are transmitted, and the data within these boundaries are slow-scanned etc., until all data blocks of the lines have been detected. Subsequently, the system indexes to the next line and the same procedure is repeated.

The other method uses a first, fast scan for covering the entire extension of a line, and all boundary addresses for data blocks and significant runs of white are detected and stored. Subsequently, another scan of the same line is carried out, beginning with a jump to an address defining the boundary of the beginning of a data block, slow scan to the end thereof, a fast jump to the beginning of the next data block etc.

It was found that in a number of different types of documents the total transmission time is reduced to one-third, even to one-sixteenth, as compared with regular transmission without compression. Saving in transmission time is, of course, the more pronounced the less there are contrasting lines on the document to be transmitted. A sheet of drawing, for example, of the type of the appended drawing to this application, when transmitted by facsimile, has many portions of significant "white" runs. Within certain parts actually an entire scanning line will show only a single black dot. For this type of drawing, the reduction in transmission time is almost one order of magnitude. The saving is less significant as to printed material of the type of this specification. Nevertheless, even for such rather condensely printed data, the saving is still better better than 2:1 as compared with regular, overall slow scan transmission of the entire area.

The selection of the length of white space regarded as a significant run of white is also material in the contemplated time saving of transmission. The method suggested here involves transmission of address codes defining the data block boundaries in addition to the data proper. It was found that a significant run of white should have minimum length which, in terms of information bits, is the equivalent of the code length required to define the two boundaries of that run of white.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
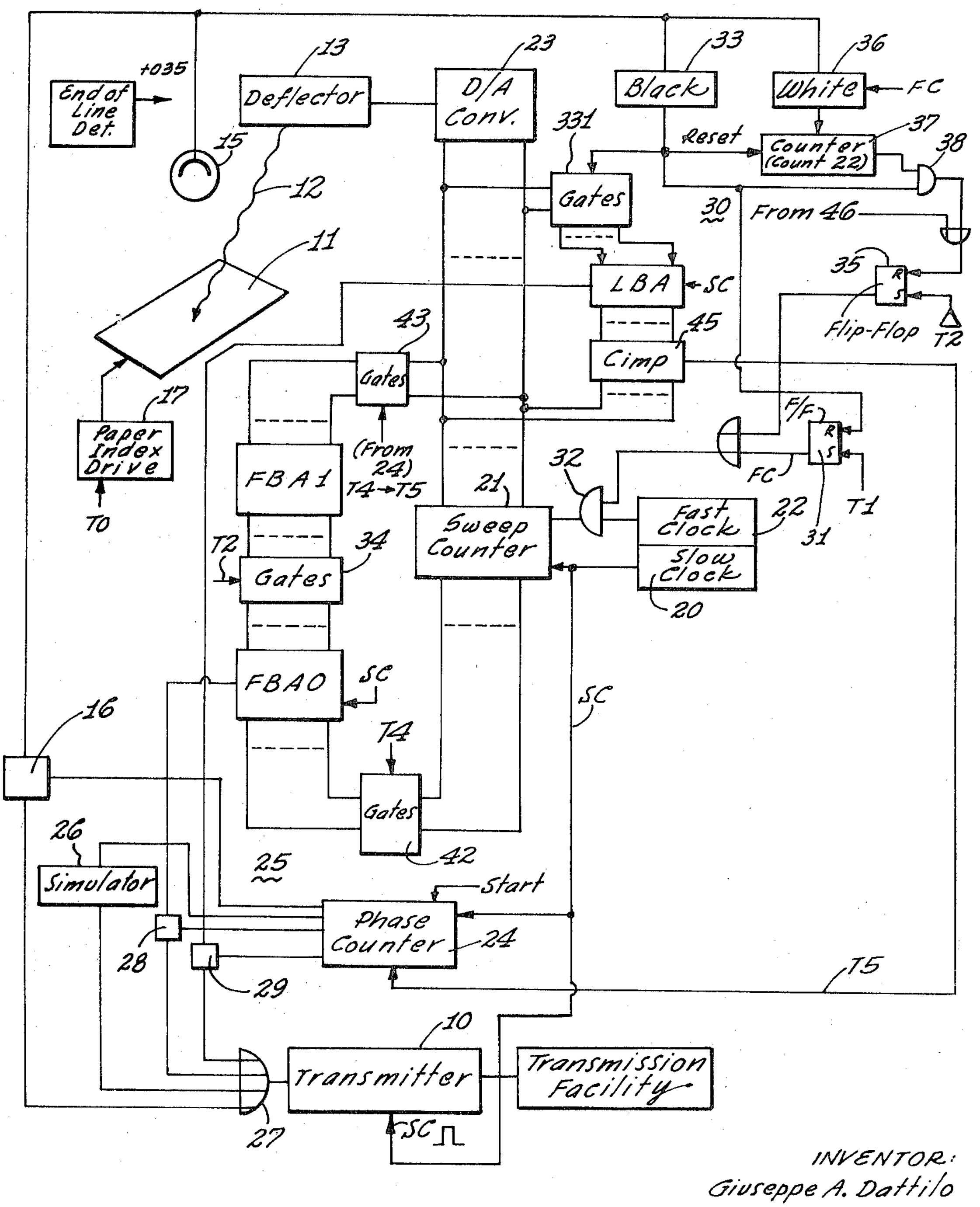
FIG. 1 illustrates a block diagram of the transmitter portion in a facsimile signal improved in accordance with a first example of the preferred embodiment of the present invention.

Proceeding now to the detailed description of the drawings, in FIG. 1 thereof, there is illustrated a facsimile transmitter which is a portion of a facsimile system, that includes the relevant elements for a first example of the preferred embodiment of the invention. The transmitter portion for this facsimile transmitting device includes conventionally a transmitter 10 coupled to a suitable transmission facility for obtaining facsimile data-modulated carrier transmission, as disclosed, for example, in U.S. Pat. No. 3,496,298.

A document 11 is line-scanned through a suitably focused illuminating beam 12 produced, for example, in a beam deflecting system 13, provided for particularly positioning the point of beam-document interception along a particular line. That point of interception defines a scanning spot delineating an elemental area on the document and defining the resolution of the facsimile pickup. The reflection of the line-scan signal by the elemental area on the document is observed by a photoelectric detector 15 which, at times, can be coupled to transmitter 10 through a suitable signal processing circuit 16 for transmission of the video type facsimile signals produced as the result of the detected contrast changes picked up by detector 15.

Scanner 13 provides deflection of the scanning beam in one direction, but the document 11 can be indexed in an orthogonal direction, both directions being in (or parallel to) the plane of the document. There is accordingly a bed for placement of the document which bed is coupled to an indexing drive 17 advancing the bed and the paper or document 11 thereon. Indexing drive 17 provides advancement in steps and in response to specific command signals to be developed within the system.

Data to be transmitted are represented in form of digital bits with a "zero" bit defining, for example, "white" and a "one" bit defining "black" which, of course, is an arbitrary assignment, but has to be maintained consistently. The circuit 16 includes decision making threshold means which interprets the particular detected reflection up to a particular level as "white" and a lesser intensity as "black." Thus, there is provided a "black" detector or discriminator 33 providing particular output upon detection of a contrast producing marking in the elemental area as illuminated by the scanning spot in the scanning area. A "white" detector or discriminator 34 provides particular output upon detection of absence of such contrast producing marking. The circuit 16 provides "one" or "-zero" bits to transmitter 10, accordingly. As the transmitter 10 may receive information on signals from other sources, there is an OR-gate 27 interposed between circuit 16 and transmitter 10.

The image information is transmitted at a rate of a clock 20 having, for example, a frequency of 2.4 kilohertz. This clock 20 will, in the following, be called the slow clock and the pulses it provides are also called slow-scan pulses, or SC for short. Transmitter 10 receives these clock pulses SC in order to present the information for transmission by the transmission facility at the rate of that clock. The clock rate is determined by the type of facility chosen for facsimile transmission. In case of telephone lines, the transmitter signal has to stay within the band width of telephone signals.

Regular facsimile systems operate with synchronized regular line-for-line scanning of the entire surface of the document and at a constant rate for the length of each line. Particularly, the scanning rate is constant and independent from the data content. The invention permits data compression, i.e., compression of the transmission process, in that the entire document 11 is not scanned image point for image point and line for line at the relatively slow data transmission rate. Instead, a facsimile system modified in accordance with the invention, permits skipping of large areas, for example, of white or background, so that the slow data scan and transmission proper is limited to areas which contain data in form of contrasting producing areas.

The document scanning process has to be considered as to the following detail. The line scan process generally subdivides the document space into a number of lines of particular width. Each line is divisible into elemental areas or image points having "length" (a) preferably equal to the width of a line and (b) equal to the distance the scanning spot propagates during one slow clock pulses period. The thus defined elemental area should have similar dimensions as the scanning spot itself to permit gapless scanning.

Each line is regarded as (possibly) being subdivided into line spaces or lengths containing (black) data and line spaces that are empty. An empty line space is defined as an arbitrarily chosen, minimum length, or larger, that contains no contrast producing marking as data. Such empty line space will in the following be called a "significant run of white." A significant white run is, for example, defined by 22 or more consecutive white elemental areas or image points. A data block is a length of a scanning line that is bounded by contrasting markings, i.e., by two "black" elemental areas in between which there may be "white" elemental areas but less than the minimum number in immediate sequence.

The principles of the first particular example of the preferred embodiment of the invention can be summarized as follows. Each line is first begun to be scanned at a very high rate, i.e., at a rate which is much higher than used or usable for facsimile transmission. The fast scan rate is, for example, thousandfold increased as compared with the facsimile data scanning rate itself. That fast scan is used to search for and to detect the first data block and the next significant run of white thereafter. The portion of the line occupied by the data block is subsequently slow-scanned and the picked up facsimile data are transmitted. The next data block, following that detected significant white run, is detected by another fast scan subphase, particularly by detecting the next significant run of white thereafter etc.

It is the principle function of the equipment illustrated in FIG. 1, to sequentially detect particular coordinates along a particular line which are regarded as boundaries for significant runs of white, by a fast scan operation. These coordinates are defined as addresses of the boundaries of the respective data block. The addresses of a block are represented by signals which are stored at first and then transmitted, followed by slow scan transmission of facsimile data picked between these boundaries.

In essence, the equipment includes the following elements. A sweep counter 21 counts pulses which for data transmission and data scan proper are derived from the slow clock 20. Searching for the boundaries of a data block and of a significant run of white is conducted by fast scanning a line, and for this a fast clock 22 is provided having frequency in the megahertz range. During fast scan, clock pulses FC from clock 22 are provided to counter 21.

An output is taken in parallel from sweep counter 21 and in fed to a digital-to-analog and 23, providing analog signals in representation, for example, of an eleven bit digital input defining the position for the beam 12. Converter 23 controls deflection circuit 13 to obtain position of the scanning beam on the document, as determined by sweep counter 21, along the current scanning line as determined by indexing drive 17. As the sweep counter is incremented, the scanning beam is moved through progressive positions at the rate corresponding to the rate of counting.

The equipment includes, furthermore, several registers, the significance of which will be developed more fully below, and there is a control section 30 which discriminates between significant runs of white and absence thereof. The system itself is under control of an operation phase counter, timer and sequencer 24 which provides timing and phase signals for the control of the various phases of operation as will be developed also below. Phase counter 24 controls particularly a transmission signal control section 25.

The state and phase counter 24 will emit timing signals identified in the following as signals To, T1, T2 etc., which provide or initiate particular control operations. Additionally, counter 24 provides phase signals persisting during periods that begin and end with sequential timing signals, so as to control and to sustain particular operations. These phase signals will usually operate as gating signals.

The input signals for phase counter 24 are the slow clock pulses SC. The structure of the phase counter is of no significance for practicing the invention, it should be just mentioned that phase counter 24 can be reset to a state zero in response to a "line scan completion" signal, and it will be reset to a particular number at the end of each data transmission proper.

Details of the various sections and of the block diagram and its interconnection will now be described with reference to a line scan operation whereby the timing diagram of FIG. 2 should be consulted frequently. It may be assumed that operation has begun generally, in that communication between transmitter 10 and a remote receiver through the transmission facility has been established, but facsimile transmission has not yet taken place.

As is conventional for facsimile transmission, the transmitter sends a synchronizing signal to the receiver in order to obtain proper overall synchronism of operation. Synchronization is established by sending a sequence of signals, of course, at slow clock pulse rate but corresponding to black image dots. These signals are being transmitted through a starting circuit which is conventional and has no significance for the invention.

After synchronization between transmitter and receiver has been established, the starting operation proper is being initiated by a start signal which can be regarded as a start signal for the phase counter 24, placing the counter into a particular count state, for example, the count state "zero," and marked by a signal T0.

In response to the phase succeeding T0, a "white" signal simulator 26 is triggered and enabled. The output of simulator 26 is fed as simulated "white" data pulses, through OR-circuit 27, to the transmitter 10 to be transmitted. Phase counter 24 meters a plurality of precisely nineteen clock pulses SC for which corresponding "white" bits are transmitted.

After the transmission of 19 "white" signals, phase counter 24 issues a timing signal T1, which initiates the following two functions. At first, timing signal T1 sets a control flip-flop 31 in section 30, which opens a gate 32 to place the sweep counter 21 under control of the fast clock 22. The second sweep counter 21 is reset. Sweep counter 21 now begins to count at a rate of the fast clock pulses FC and beam 12 is placed in sequential positions along the first line, at a rapid rate.

The detector 15 observes the reflection and "black" detector 33 will respond to the first black image dot, i.e., detector 33 responds to the first contrasting increment of information on that line, should it occur. Assuming the line contains at least one black elemental area as image increment, detector 33 resets flip-flop 31 and sweep counter 21 stops.

The content of the sweep counter 21 is now a particular number which can be regarded as an address on the particular line defining the beginning of a data block which is the first data block on that line. A first register FBA1 is coupled in parallel to the digital output of sweep counter 21, in parallel to D/A-converter 23. Register FBA1, therefore, is updated with the sweep counter and contains at that point the address of that first black image increment.

As stated above, the fast scan has been stopped at that point but additional eleven "white" pulses are transmitted by the transmitter 10 as still provided by the continuously operating simulator 26. It should be mentioned that the fast scan outlined above and which can be described as a prescan or search scan, is considerably faster than the clock pulse rate of the slow clock pulses; therefore, these prescan operations for detecting the first black image increment on lines may well have been completed by the time the first one of these additional eleven "white" pulses have been transmitted. These additional eleven "white" pulses are needed as the receiver should receive a particular chosen number, such as 30 of "white" bits, before obtaining any information. This relates to the establishing of phase synchronism of the particular transmission program that is inherent in this inventive system. The receiver, as will be described later, begins to count "white" bits and waits for 30 of such white bits to be received and times further operations from that instant. The transmitter system as described now has to wait until these eleven "white" pulses have been transmitted.

After altogether 30 clock pulses have been counted, the phase counter 24 terminates the "white" signal simulating phase and emits another timing signal T2 which operates as a transfer control and gating signal for a set of gates 34, to transfer the content of the register FBA1 in parallel to a register FBA0. Thus, register FBA0 now holds the address of the fast dark, i.e., contrasting elemental area, as image increment on that line. With the next clock pulse SC, another transmission operation is begun. For this, the phase counter 24 opens a gate assembly 28 which connects a serial output of register FBA0 to one of the inputs of OR-gate 27, leading to transmitter 10. Phase counter 24 now meters a period of altogether precisely eleven clock pulses, and for the duration of that counting operation, the slow clock 20 is operatively connected to serial shift clock input terminals of register FBA0. Thus, the content of register FBA0 is serially shifted out of the register, and through gates 28 and 27, for transmission by the transmitter 10. This way, the transmitter provides to the receiver the address of the first data block.

Aside from the foregoing, the timing signal T2, that marked the termination of transmission of 30 "white" bits, has also set a flip-flop 35 which provides an alternative enabling input for the gate 32. Accordingly, the sweep counter 21 resumes counting of fast clock pulses FC, continuing from the address of the beginning of the first data block. The fast search scan as controlled via the digital-to-analog converter 23 and deflecting circuit device 13 is resumed accordingly.

There is still another register connected in parallel to the output lines of sweep counter 21. This register LBA is not, however, continuously updated with sweep counter 21. Instead, a set of transfer gates 331 between counter 21 and register LBA is closed as long as the scanning beam propagates over white space on the document; but each "black" elemental area as detected by "black" detector 33 opens the gate 331. Thus, the content of register LBA is updated with detection of contrasting markings on the scanning line. To state it differently, register LBA holds at any instant the address of the respective last dark image increment as detected up to that point. If subsequently a significant run of white is detected, that address is also the address of the end of the first data block as succeeded by a significant run of white.

During the resumed fast search scan, a "white" image increment detector 36 responds to each white image increment, particularly after a first black increment has been detected (i.e., subsequent to T1 or T2). The output pulses of detector 36 increment counter 37. However, counter 37 is reset with each black image increment as detected by detector 33. Still, concurrently the content of the register FBA1 is updated with the progression of sweep counter 21, in strict synchronism therewith and independent from particular data detection.

It is emphasized that this fast search scan operation presently described is essentially carried out in the beginning of the relatively slow transmission of the content of the FBA0 register that begun at T2 and covers under all conditions only a very small portion of the entire transmission time, as the transmission time requires eleven slow clock pulses whereas, for example, there are 1.000 fast clock pulses per slow clock pulses, and the total number of image increment and data bits per line may, for example, be in the order of $10^3$.

Now, it shall be assumed that after a certain plurality of image increments, which include black markings, there is a stretch of white defined by 22 consecutive "white" data bits. Thus, counter 37 is not being reset prior to having counted 22 "white" bits. As counter 37 reaches count number "22," a gate 38 is enabled, and remains enabled until counter 37 is reset. The significance thereof is that upon detection of the next black image increment the end address of the detected significant run of white is detected therewith, flip-flop 35 is reset and gate 32 is blocked so that fast sweep counter operation stops again with the detection of that end boundary of the significant run of white.

At that point in the operation, register FBA1 holds the address of the just detected end of the significant white run, and register LBA holds the address of the beginning of that significant white run, which is also the end of the first data block, the beginning address of which is currently transmitted by transmitter 10. At phase time T3 transmission operation of the address of the beginning of the first data block has been completed and the phase counter 24 so signals by issuing a timing signal T3 and disabling further shift operation from register FBA0; also, gate 28 closes.

The phase signal succeeding timing signal T3 causes a gate 29 to open. That gate couples a shift output of register LBA to still another input of OR-gate 27. Likewise, that phase signal operatively couples the slow clock 20 to a shift clock input of register LBA. Accordingly, after time T3, the address of the end of the first data block is shifted out of the LBA register, at the slow clock pulse rate, and is passed to transmitter 10.

Figure 2:
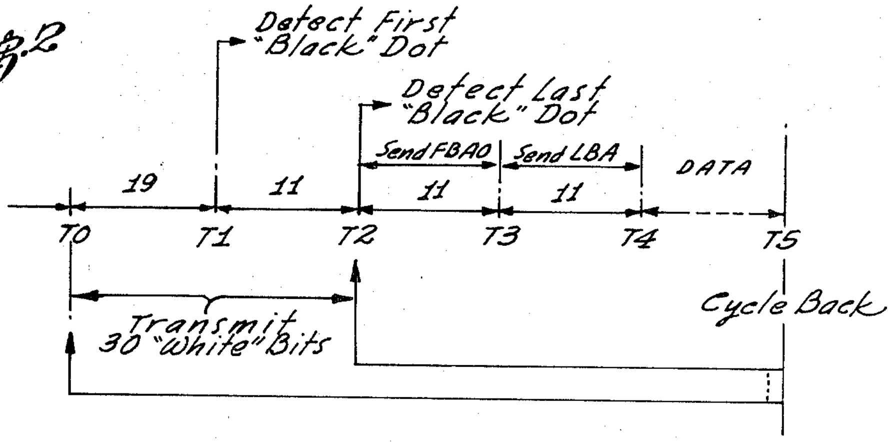
FIG. 2 illustrates a timing diagram having relevancy in the circuit shown in FIG. 1.

It follows that after eleven bits have been transmitted, identifying the beginning of the first significant data block as an address, additional 11, slow clock pulses are used to time transmission of the address of the end of that first significant data block which covers the period from T3 to T4 (see FIG. 2).

It should be mentioned, however, that registers FBA0 as well as LBA are recycling registers so that upon completion of transmission of the respective addresses they are again held in the registers. At this point then (time T4), the state of the registers is as follows: register FBA0 holds the address of the beginning of the first "black" data block on the document, register LBA holds the address of the end of that data block, that is also the beginning of the significant run of white thereafter, and register FBA1 holds the address of the end of that run of white that is also the beginning of the next data block.

As phase counter 24 issues timing signal T4, a phase signal commencing therewith enables a set of gates 42 to couple register FBA0 to eleven parallel input lines of sweep counter 21, to force a particular count number into that counter. As a consequence, D/A Converter 23 receives a change in input corresponding to a retrace of beam 12 to return, as fast as the electronics thereof permits, to the black elemental area and image point defining the beginning of the first significant data block.

The phase signal issued by counter 21 and beginning at T4 couples the slow clock 20 to the sweep counter 21. Still that same phase signal now is used to enable circuit 16 to couple the "black" and "white" detectors to the transmitter 10. Additionally, the input of register FBA1 is decoupled from counter 21 to retain the address of the beginning of the next data block it still holds (gates 43).

Counter 21 is now updated at the slow clock rate for transmission, but data are actually scanned by the facsimile equipment for the first time. As sweep counter 21 is incremented at the slow clock rate, the output of the digital-to-analog converter 23 gradually positions the beam 12 along the particular line of document 11 to read-scan the first data block, beginning with the first "black" elemental area thereof. A comparator 45 compares continuously the digital number, as presented by sweep counter 21, with the digital number held in the LBA register which is the address of the end of that first data block. As the sweep counter content agrees with that address, comparator 45 responds and terminates data transmission.

As far as systems operations is concerned, this termination of data transmission is implemented by causing the comparator 45 to reset the phase counter 24 to a count state corresponding to the time T2. It will be recalled that several operations are initiated by timing signal T2, and by the phase signal succeeding that phase point in operation.

At first, it has to be considered that register FBA1 still holds the address location of the end of the previously detected significant white run which, by definition, is also the beginning of the next data block. At the end of the previous data read scan, sweep counter 21 has again arrived at the address corresponding to the beginning of that run of white, so has the scanning beam. It will be recalled further, that timing signal T2, now produced anew, opens gates 34 and the current content of register FBA1 is set into the register FBA0. Also, timing signal T2 marks the beginning of a transmission phase for transmitting to the remote receiver the content of register FBA0, as the address of the beginning of a data block, that is now the address of the second significant data block. This transmission operation requires opening of gate 28 and proceeds as aforedescribed.

The timing signal T2 sets additionally the content register FBA0, as currently received from FBA1, also into counter 21 by opening gate 42. That transfer is, of course, a copying process which precedes the transmission of the content of register FBA0 and does not destroy the content thereof. Thus, as the transmission of the address of the beginning of the second data block begin, scanning beam 12 is deflected to arrive at that previously detected address.

Still, concurrently upon T2, the fast sweep is reactivated because the flip-flop 35 is set again, gate 32 opens and fast clock pulses are applied to sweep counter 21. Thus, fast search scan proceeds from the address of the beginning of the second data block. The content of register FBA1 is updated upon incrementing of counter 21, while register LBA receives the content thereof when concurring with a "black" detection signal. Still, concurrently "white" detector 36 tends to increment counter 37; that counter was reset at T2 upon return of the scan beam to the beginning of the second data block.

The significant-run-of-white counter 37 responds when the end of the second data block is detected, by implication, namely by detection of another significant run of white. As that occurs, register LBA holds the address of the end of the second data block, register FBA1 holds the address of the beginning of the third data block and register FBA0 holds and is still occupied with the transmission of the address of the beginning of the second data block.

As phase time T3 is reached by the phase counter, the last mentioned transmission is completed and the address held in the LBA register is transmitted. Subsequently, the scanner retraces to the beginning of the second data block, and slow scan and transmission thereof begins.

One can readily see that this operation proceeds by detecting the end of a data block and the end of the significant run of white thereafter, while transmitting the address or the beginning of that data block, followed by transmission of the end boundary address thereof, which, in turn, is followed by slow data scan and transmission.

It will be appreciated that the fast search for the first data block is actually carried out in two steps, one beginning at T1 but stopping upon detection of the first "black" marker; the fast search for the end boundary of the first data block is resumed at T2. It will also be recalled that the end of a data block is shortly followed by detecting the beginning of the next one, as the extent of a significant run of white is conveniently detected always in one step. Actually, the beginning and end addresses for the first data block (and the beginning of the next one) could be detected after T1 without the interruption, but system operation is facilitated if the system recycles back to T2, and similar operations are carried out thereupon and thereafter. Thus, it is convenient to provide system operation by causing the end address of a block and the beginning of the next one (or end of line) to be detected in a fast sweep portion after phase point T2. This requires separate operation of detecting the beginning of the first data block which is the reason for providing for the separate detection step.

As was stated above, a significant run of white is defined by 22 consecutive bits. The response of counter 37 establishes this criterium as signal manifestation. As to the particular number involved, one can readily see the following: the transmission of a block of data requires a particular period of time, that is directly proportional to the length of that block. Each transmission of data is preceded by the transmission of 22 bits of control information, namely the two addresses of the data block, 11 bits each. The smallest data block is a single black increment, so that the smallest complete data transmission run, involving one block, is 23 bits (or 23 clock pulse times). This is one of the reasons for choosing a minimum of 22 consecutive white data bits, as detected by detector 15, to define a significant run of white.

Considering the cases on an individual basis, it would not serve any purpose to choose a smaller length of "white" as the time saved by avoiding transmission of long "white" data at slow scan should not be shorter than the time required for transmitting the addresses of the data blocks. However, it should also be taken into consideration that this needs to be true only on the average, not necessarily in each individual case, so that even a slight increase in transmission time in some cases may be offset by large time savings in other cases as far as operation of the transmission system as a whole is concerned. Since most of the significant runs of white are considerably longer than 22 bits, it may seem then, that even shorter runs of white should be eliminated also. However, upon closely analyzing various cases and particularly the various formats of printed matter to be transmitted, it was particularly found that by choosing a minimum number of "white" bits to be equal to the total number of bits which are needed to transmit the addresses defining beginning and end of a data block, optimum conditions as far as time saving by data compression is concerned, are, in fact, obtained.

It must now be considered that during a fast scan the scanning beam will sooner or later pass across the margin of the document defining the end of a line. If all documents had the same width, one could identify that margin by a particular address and terminate operation from the count state of counter 21 corresponding to that address. Alternatively, a conventional limit or end-of-line detector 46 can be used. As end-of-the-line detector 46 responds, the output signal is an alternative input for resetting flip-flop 35 to terminate the fast scan regardless of the state of white run counter detector 37.

By that time, the last data block has been transmitted, and the system does not cycle back to the phase time T2, but phase counter 24 is shifted to time T0. As a consequence, 30 simulated "white" data bits are transmitted in representation of a new line. These 30 "white" bits can also be regarded as horizontal sync pulse, to synchronize the receiver accordingly. Signal T0 is also used to control index drive 17 to shift the document 11 by the distance of one line spacing, transverse to the direction of line scanning. The operation now proceeds with the next line in exactly the same manner as aforedescribed.

It can readily be seen that white space, for example, along upper and lower margins, or in between printing lines on the document, are scanned over by one fast scan sweep in that the end of line detector 46 has responded even before the 30 white bits have been transmitted, the paper is indexed again, another block of 30 "white" vertical sync bits are transmitted etc. As the entire document has been scanned, the turnoff of the entire system in termination of facsimile transmission can be had as is conventional for facsimile transmissions operation.

Figure 3:
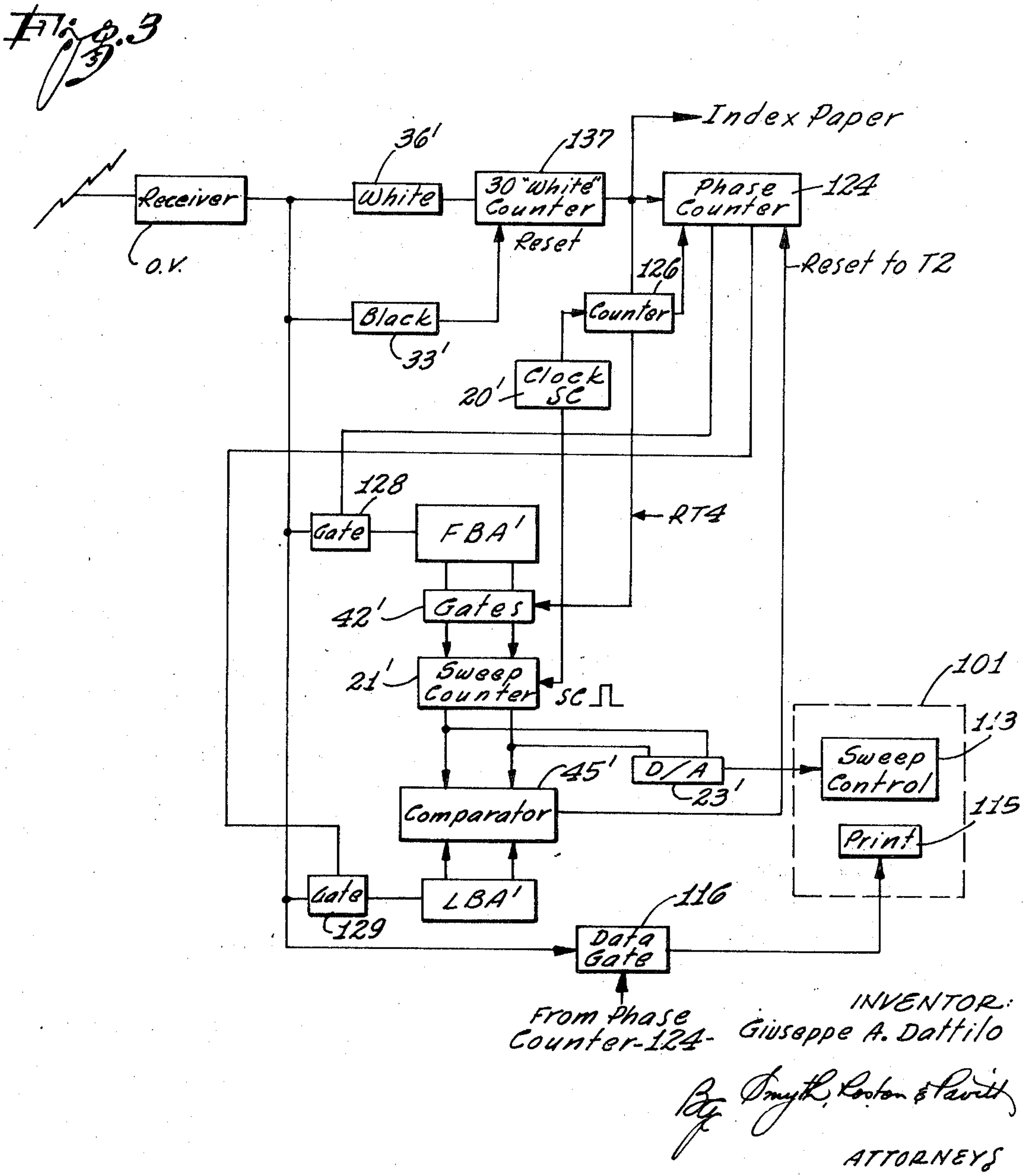
FIG. 3 illustrates receiver portion of a facsimile system designed to process the information as transmitted by a transmitter as shown in FIG. 1.

Turning now to FIG. 3, there is illustrated a receiver portion of a facsimile system improved in accordance with this particular embodiment of the present invention. This figure can be interpreted as a remote receiver with which the transmitter, illustrated in FIG. 1, communicates; alternatively, the FIG. 3 can be interpreted as the receiver portion of a facsimile transmitter-receiver. There is a number of elements in the receiver which are time shared when considered as being in the same station as the transmitter. Such elements have been identified in FIG. 3 by corresponding numerals but with a ('). Also, corresponding phase points in time are denoted analogously, but preceded by the letter R. Thus RT2 denotes the phase in which the receiver must be ready to receive the first address; RT3 identifies the beginning of the second address; RT4 identifies the beginning of data reception.

The circuit in general includes a receiver portion 100 coupled to the transmission facility through which the transmitted facsimile signals are received. The receiver portion 100 may be combined in parts with transmitter 10 as a modem unit. The facsimile receiver includes an image recomposing device 101 of general design but must include a sweep control 113 operating as a line scan device or the like and being capable of selecting printout operation on addressable points of a line. Scan control 113 cooperates with a suitable type of dot-printer, adapted for obtaining a printout, or a photographic recompositioning or the like. The printing device is denoted in general by reference numeral 115, and it is presumed that printing unit 115 receives "black" and "white" facsimile data bits and causes the information content of the data bits to be printed as an image increment and in a location determined by the sweep control 113 at any instant.

The sweep control and printout line scanner 113 is under control of the output of the digital-to-analog converter 23' to position-control the location of the current printout. In the receive mode of operation, sweep counter 21' receives pulses from the slow clock 20' only, which, of course, must operate in strict synchronism with the transmitter clock. There may be a fixed phase difference but the frequencies have to be identical. Usually, facsimile clocking is derived from the mains, slaved oscillators or the like. The receiver circuit makes also use of the pair of registers FBA' and LBA', having similar function to that of registers FBL0 and LBA in the transmitter circuit.

Proceeding now to details of FIG. 3, it will be recalled that each facsimile transmission is preceded by a plurality of black image bits which are transmitted to obtain synchronism between transmitter and receiver generally. The transmission proper begins, as was outlined above, with transmission of 30 simulated "white" image bits. Accordingly, there is a "white" bit counter 136 which is connect ed to "white" bit discriminators 361, the counter 136 is reset by the output of a "black" bit detector 331. These two detectors or discriminators 361 and 331 are connected in the receive mode to the receiver facility 100.

After having detected 30 consecutive "white" bits, a phase counter 124 is placed into a state in which it issues a timing signal RT2. In addition, a phase signal issues to enable a gate 128 having its input side coupled to the output of receiver 100 serially feeding the information bits, now arriving, into register FBA'. It will be recalled that after transmission of 30 simulated "white" bits, the transmitter sends 11 bits indicative of the address of the first data block. These address bits are serially shifted into register FBA'.

As bits arrive after 30 "white" bits, an address format counter 126 counts 11 clock pulses, whereupon it provides a signal to phase counter 124 which, in turn, issues timing signal RT3 and the phase and gating signals for gate 128 turn false. Counter 126, continues to count another 11 clock pulses. Concurrently thereto, phase counter 124 provides a phase signal to a gate 129, and the following 11 information bits, received by the receiver 100 are set into register LBA'. It will be recalled that subsequent to transmission of 11 information bits defining the address at the boundary of the beginning of the first data block, the facsimile transmitter transmits another 11 information bits which define the end address of that first data run. These 11 address bits are now set into the register LBA'. As again 11 control information bits are involved, counter 126 operates to count 11 slow clock pulses, and upon completion thereof, phase counter 124 issues a signal RT4.

The timing signal RT4 serves as a strobing signal for a set of gates 42' which cause copying of the number held in register FBA′ into sweep counter 21′. The sweep counter begins to increment that number by counting slow clock pulses SC. It will be recalled that subsequent to transmission of the address of the end of the first data block the transmitter actually issues data, scanned from in between the two address locations on the line. Thus, as soon as sweep counter 21′ receives the content of register FBA′, the D/A converter 23′ causes sweep control 113 to jump to a position which marks the beginning of the first significant data run to be printed. Thereafter, counter 21 is progressively incremented and causes the scanner 113 to shift across the scanning line at clock pulse rate (SC).

Concurrently to the locally produced line scanning, receiver 100 receives and provides data bits which are fed through a gate 116 to the printing circuit 115. The gate 116 is opened by a phasing signal commencing with RT4, which coincides with phase point T4 of the transmitter.

As sweep counter progressively provides sequential addresses for data bits, sweep control 113 shifts the dot printing into successive positions until the comparator 45′ detects equality between incremented sweep counter number and the end-of-data block address held in register LBA′, whereupon the printing operation is temporarily terminated, as all data within the first data block, have been printed.

The output of comparator 45′ causes phase counter 124 to shift back to the phase point RT2 which places the receiver in the condition to receive the next address for the beginning of the next data block; the end address of that second data block is received thereafter succeeded by reception of data of that second data block itself. The system, thus, cycles through the phases in synchronism with the transmission operation.

As the receiver receives 30 "white" data bits after completion of reception of the data from a block, end-of-the-line is indicated, and these 30 "white" bits signal the necessity for line shift analogous to vertical sync. It should be noted that during normal data transmission some "white" bits may be included in a data block, but 30 consecutive "white" bits are never transmitted as data, as that number is in excess of the number of "white" bits that define a significant run of white, nor is it possible that the addresses have a format in which there are 30 consecutive white bits. The registers LBA′ and FBA′ may receive all "white" bits each, but the supply of "white" bits continues and counter 137 responds.

Upon receiving 30 white bits, counter 124 is reset to phase RT2. Additionally, the paper is indexed. The indexing operation is comparatively slow, but the entire period during which the addresses of the beginning and of the end boundaries of the first data run of the second line are being received is available. The system, thus, cycles through these phases as outlined until all data have been printed, and, of course, the receiver is stopped in a manner as is known, per se, for facsimile operations generally.

The embodiment described above is predicated on the principle of alternating between detection of the boundaries of a data block and of transmission of the addresses thereof as well as of the date in that block, succeeded by another detection cycle. In other words, fast and slow scan operation for one line alternate until all data blocks of the line have been identified and transmitted. This requires repeated retrace of the scanner during processing of the information of the same line. If was found, however, that there are certain speed limitations resulting from the fact that the sweep counter causes a rather fast retrace from the beginning of a data block back to the address of the beginning of the preceding data block, to carry out slow scanning operation for data transmission. In case the significant run of white that separates them is long, the retrace is not an instantaneous process and its accuracy is limited. This was found to be troublesome or to necessitate extremely powerful and extremely accurately operating deflection systems which add to the expense. The system to be described in the following obviates the need for such high degree of accuracy for the sweep control but necessitates larger storage facilities.

The embodiment described next is predicated on these operation principles: first, an entire line is fast-scanned in one sweep, and all of the addresses of the beginning and end boundaries data blocks are ascertained and stored. Then there is one retrace to the beginning of the line or of the first data block, and slow-scan is provided between each beginning and each end address of the several data blocks with fast skipping over the white space as defined by the end address of a data block and the beginning of the next one. Thus, there are at the most only two retraces per line, one after the fast search sweep and again after completion of data scan (if there was any data block on that line).

Figure 4:
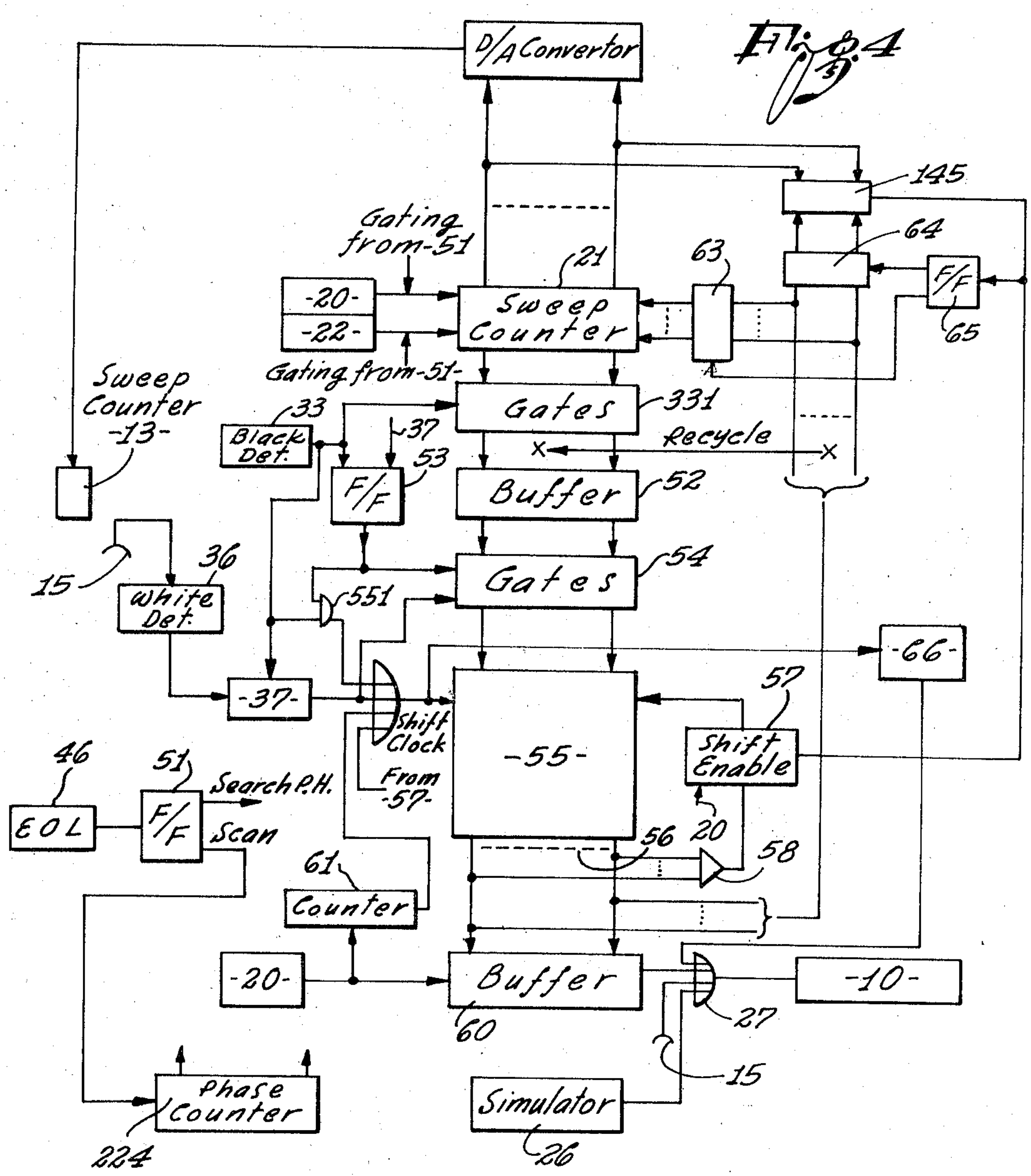
FIG. 4 illustrates a block diagram of a transmitter circuit, in accordance with a second example.

In FIG. 4 there is again illustrated the facsimile pickup detector 15 and the sweep control 13 for providing particular scanning positions along a line of the document to be scanned in dependence upon the instantaneous analog output of the digital-to-analog converter 23 receiving digital input signals from the sweep and address counter 21. As stated, the system alternates between a fast search scan and address detect phase uninterruptedly on the entire line, and a slow data scan and read phase for the data blocks on the line. A flip-flop 51 which can be a toggle flip-flop, toggles between set and reset states in representation of these two phases. The trigger signal is provided by the end of line detector 46 which responds twice for the acquisition operations involved for each line.

During a fast search scan phase, the high frequency oscillator or fast clock pulse source 22, has its output coupled to the counter input of the sweep counter 21 to increment the same from zero to the highest number, corresponding, for example, in case of a left to right scan, respectively, to the right- and left-hand margin of the document to be scanned. Again, it should be mentioned that in view of the fact that the total number of addresses of a line is approximately equal to the frequency ratio of fast or slow clock (at least as far as order of magnitude is concerned), the entire search scan operation of a line takes an insignificant amount of time, covering approximately one, or a few at the most, slow data bit rate periods. Therefore, as the fast search phase is initiated and counter 21 is incremented in response to fast clock pulses from clock 22, the following events transpire.

The "black" detector 33 searches for "black" elemental areas and image increment, and for each detected one, gates 331 are enabled, so that the address number for that bit held in the sweep counter 21 is set into a buffer 52. The buffer has eleven stages corresponding to the number of bits defining a black increment address accordingly. A circuit 53, which may be a flip-flop, is set with the starting operation. Whenever flip-flop 51 changes state to assume state defining the search phase, flip-flop 53 is reset with the first black increment as detected by bit discriminator 33.

The set-state output of flip-flop 53 enables transfer gates 54. As a consequence, the address of the first black data bit detected is applied to the input of a memory 52, to be set into the first location thereof. Memory 55 is comprised of a plurality of 11, parallelly operated shift registers to serve as pushdown-type memory. Subsequent addresses of "black" bits of the same data block are not set into the memory as gates 54 are now inhibited.

The first address passed into the first memory location of memory 55 is again the address defining the beginning of the first data block. The updated addresses in any instant in buffer 52, define the respective last address of a detected "black" data bit. Counter 37 is used also here to search for 22 consecutive "white" data bits as detected by "white" image increment detector 36 as aforedescribed. The counter 37 is, of course, reset throughout a data run by detector 33 until having counted 22 "white" bits. As that occurs, the address of the last black bit as held in buffer 52 is now identified as end boundary address of the first data block.

The output of counter 37, identifying response to 22 "white" bits, is used as strobe and alternative gating signal for gates 54, to place that address into the first location of memory 55. In addition, the output of counter 37 is used as shift clock signal in memory 55 to transfer, for example, the content previously held in the first memory location, into the next one. Each transfer in and into the memory 55 is accompanied by incrementing a counter or shift register 66 which keeps track of the number of addresses sequentially set into memory 55. Finally, white run detector 37 sets flip-flop 53 to prepare gate 551 for the next "black" signal.

It can thus be seen, as sweep counter 21 runs from count state zero to the count state defining the end of the line, beginning and end boundaries of data blocks are detected alternately, and the respective addresses are consecutively set into and shifted through memory 55. The memory shift clock is alternatingly derived from the output of significant white run detector counter 37 and from the first black bit detected thereafter. The set state of flip-flop 53 and the output of detector 33, via AND-gate 551, provide the alternative memory shift clock during the fast search scan.

Upon completion of a fast search scan memory 55 holds addresses defining beginning and end of significant data blocks and in alternating locations. The number of addresses expected to be held in any individual case is uncertain, but one can readily see that the maximum number of addresses, which can possibly be produced in that manner, is two times the total number of addresses that may have been detected, is approximately somewhat less than one-tenth of the total number of bit positions on the line. The capacity of memory 55 has to be designed accordingly. Of course, the length of a scan line and the number of bits per line, are variable parameters. However, for given dimensions and for a predetermined resolution, the number of bit positions per line is not subject to any significant variation. On the other hand, the number of 20 bit positions for defining a significant run of white, is an arbitrary number. Therefor, that number can be used to adapt a specific system to a given buffer capacity.

As the end of the line has been reached, the phase flip-flop 51 is toggled and shifts to the slow scan phase-state. During slow scan phase, slow clock 20 is coupled to the input of sweep and address counter 21. In addition, and here particularly during the first slow clock pulse period in the slow scan phase, the memory is prepared for readout. The data block addresses held in memory 55, have to be shifted through so that the first address appears on the output bus 56 of the memory. A shift enable circuit 57 is provided, for example, for providing fast or slow clock signals from source 22 or 20 to the shift clock input of memory 55, beginning at the end of the fast search scan phase until disabled by the output of a NOR-gate 58. NOR-gate 58 is coupled to all 11 output lines of the output bus 56 of memory 55, to provide a control signal to the shift enable circuit 57 as long as only "zeros" are on all of the output lines of the memory. As soon as the first block address arrives at bus 56, shifting stops.

Independent from memory readout preparation, but after termination of the first search scan, a simulator 26 is coupled to transmitter 10 to cause the transmitter to transmit 30 "white" bits for line synchronization. This is similar to the synchronizing operation as was described above and does not require elaboration. A phase counter 224 may be provided to suitably phase-control operations during the slow scan phase. Upon receiving 30 consecutive "white" bits, the receiver is notified that subsequently the transmitter will transmit all of the addresses of the boundaries of all of the several significant data runs.

After having transmitted these 30 sync bits, phase counter 224 establishes a state in which the register 66 is serially coupled to the transmitter to transmit an 11-bit number defining the number of addresses held in memory so as to inform the receiver as to the number of data blocks of that line. Thereafter, the system shifts into a memory readout phase.

The first address code has been set into a buffer 60 by the last shift clock pulse from 57. As soon as the 11 bits from register 61 have been transmitted, the slow clock 20 operates buffer 60 for serial shifting, and an output stage thereof passes the data bits to transmitter 10 for transmission to the receiver. A count "11" counter 61 tracks the format of each address and provides a serial shift pulse to memory 55 with each completed 11 count, whereupon another address is shifted from output bus 56 into buffer 60. Thus, all of the various address codes are sequentially fed from memory to buffer 60, and are serially shifted out for transmission. Therefore, all detected 11-bit-address-codes, defining in alternation beginning and end of data blocks of a line, are transmitted in sequence of direction.

Each address, before or after being serially shifted into transmitter 10 (and recycled into buffer 60), are also shifted back in parallel to the input 55 buffer 52 or memory, with the output of format counter 61 opening the gates 54. Thus, after all of the various address codes have been transmitted, the memory is in the same state in which it was at the end of the fast scan phase. After the last address has been transmitted and recycled, an all zero code will appear in bus 56, NOR-gate 58 responds and again enables shift circuit 57, so that again all of the various address codes are shifted toward the output bus 56 of the memory until the first one appears again at that output bus 56.

In the meantime, phase counter 224 has changed state, and now it has to be considered that bus 56 connects also to a pair of gates 63 and 64. These gates are under control of a toggle flip-flop 65 which toggles on each change in output of a comparator 145 as will be described below. The gates 63 and 64 together with toggle flip-flop 65 actually constitute a switch to alternatingly switch beginning-of-data-block addresses and end-of-data-block addresses into different paths. Thus, the content of the output stage of memory 55, as applied to bus 56, is set alternatingly into the sweep counter 21, or applied to one side of the comparator 45.

As an address number is switched from memory into sweep counter 21 via gates 63, D/A converter 23 places the sweep beam 12 to interrupt the document in a particular point, which is the beginning of a data block. Counter 21 counts low-rate clock pulses from source 22 and sweep control 13 repositions the scanning beam accordingly to scan across that block. During this counting and slow scan operation, data facsimile signals are provided by the detector 15 and transmitted.

In the meantime, the next address is on bus 56 and is applied to the one input of comparator 145. As the sweep counter 21 has been incremented so that its number agrees with the number held in memory bus 56, comparator 145 responds and operates shift enable circuit 57 to shift the content of the memory down by one step. Accordingly, the next address, which is a data block begin address, is shifted to the output stage of the memory. Also, flip-flop 65 toggles and opens gate 63, and this next address code is set into the sweep counter 21 which, in turn, provides a rather fast forward sweep to cause the beam to home in on the end of that significant white run, which extends in between the data block just transmitted and slow scanned, and the beginning of the next one as defined by the address set into counter 21.

The output circuit of comparator 145 may, for example, be constructed so that separate pulses are derived from the leading edge as well as from the trailing edge of each of the "compare" situations as detected therein. As the "compare" situation is detected, a first pulse toggles flip-flop 65 and provides a memory shift. Thereupon, counter 21 is loaded with a beginning address. As a consequence, the compare situation decays and flip-flop 65 toggles again while another shift clock pulse for the memory 55 is produced. Accordingly, the next address code, which is an end-of-data-block address, appears in bus 56 and is applied to comparator 145 to remain until there is again agreement, etc.

These operations proceed in alternation until NOR-circuit 58 detects again zeros in all output positions of bus 56 which is significant as to the fact that now all addresses have been sequentially used in the circuit, either by having been set into the sweep counter, or by having been applied to comparator 145. During slow scan there is no recycling so that now the memory is completely empty. One can readily see that the data are actually transmitted in one consecutive sequence, even though they may pertain to different blocks which are separated by white space. This transmission was preceded by transmission of all addresses defining the boundaries of the several data blocks, and the latter transmission was preceded by transmission of the number that defines the number of addresses. Thus, separation of addresses and data can readily be controlled by the receiver, through suitable tracking of the format of the signals as received. After the memory has been emptied again, all significant information, control information and data of that line, has now been transmitted, whereupon paper will be indexed, flip-flop 51 is toggled and the system shifts back into the fast search scan phase to search for data block boundaries in the next line etc.

Figure 5:
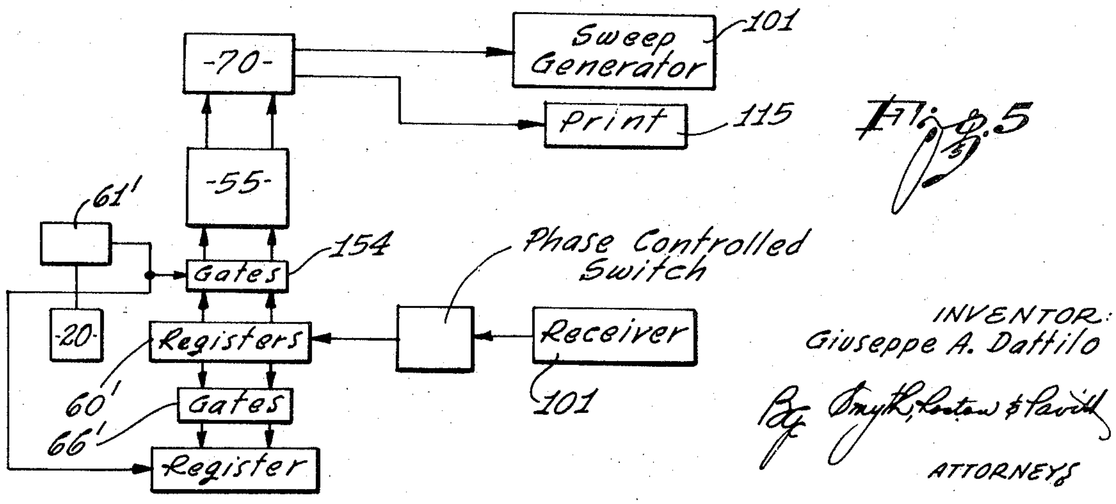
FIG. 5 illustrates the corresponding receiver circuit.

As illustrated in FIG. 5, the receiver side is analogously constructed; in essence, its overall function is to alternate between storing the sequence of data boundary codes transmitted in one long run of control information transmission, and subsequently the memory is read out in strict synchronism with the concurring memory readout on the transmitter side to cause the printout and to jump from block to block. Therefore, the block 70 in FIG. 5 includes all of the elements 21, 63, 64, 145, 65, 62 and appropriate phasing control is coupled to the sweep control 101 for facsimile data printout. The memory 55' has an input register 60', and the output signals from receiver 100 are serially shifted into that buffer, beginning after completion of reception of 30 "white" synchronizing bits. At the first count of 11 by the format counter 61', there is a transfer in parallel to a register 66'; these first 11 bits define the number of addresses to follow. At the next count of 11 slow scan clock pulses, and for each set of 11 pulses thereafter, the content of buffer 60' is transferred, also in parallel through a set of gates 154 to memory. The transfer signal from counter 61' serves also as shift pulse for the content of the memory analogous to shifting provided during readout for transmission as described above. Additionally, counter 66' is decremented.

After all address codes have been transmitted, counter 66' has been decremented to "zero," and the facsimile receiver shifts to data-scan operation. The memory readout is analogous to memory operation during data transmission. The memory content is used, in steps, to control the block-for-block data scan, the first address readout defines the beginning of a data block, the next one the end thereof, the next one the beginning of the next block etc. The printout scan proceeds to the first address and proceeds from there at the slow scan rate. Concurrently, data bits are being received and applied to printer 115. The next address defines the end of that block, and as the sweep counter reaches that number, another address is drawn from memory, whereupon the deflection control jumps to that address to skip over what will remain white space and to proceed print sweep for the next block at appropriate location. The data bits of different blocks themselves follow each other in immediate sequence, but the print sweep has rapidly skipped over the white space to "-decompress" the data compression in the transmission. Thus, the deflection control for the printing apparatus will pass over line increments defined as long white runs but slow print scan proceeds in between. At the end of the last data, there will appear 30 "white" bits signalling indexing and operation concerning the next line will proceed.

The invention is not limited to the embodiments described above but all changes and modifications thereof not constituting departures from the spirit and scope of the invention are intended to be included.

I claim:

1. In a facsimile transmission system, there being means to provide line scanning of a document or the like within a particular area to obtain a facsimile signal, there being means to provide transmission of a facsimile signal, the combination comprising:

first means providing signals representing addressing codes for the scanning area along a scanning line in representation of the relative position of elemental areas thereon;

second means operating the line scanning means for providing a relatively fast search scan of a line of the scan area for detecting portions of the area along the line having no contrast-against-background information, and including means connected to the first means to provide signal representations of the addresses of the elemental areas defining the boundaries of said portions;

third means connecting the second means to the transmission means for transmitting the signals representing the boundary addresses;

fourth means operating the line scanning means for providing relative slow scan along the line and being responsive to the signal representations of the boundary addresses to restrict the slow scan to line portions in between the boundaries while skipping portions having no information; and fifth means connecting the fourth means to the transmission means for transmitting facsimile data as obtained during the slow scan in representation of the information between the boundaries.

2. In a facsimile system as in claim 1, including a receiver having line scan means and means for receiving facsimile signals and providing reproduction thereof, the receiver additionally comprising means responsive to signals representing addresses of boundaries to control reproduction of received facsimile signals along line portions defined by the boundaries.

3. In a system as in claim 1, the second means including means (a) to detect the address of each elemental area on the line holding contrast information including a first elemental area as a first boundary, and means (b) to responsive to a minimum number of consecutive elemental areas without contrast information to define the respective last contrast information holding elemental area as a second boundary.

4. In a system as in claim 3, the minimum number selected to approximate the number of bivalued digits required for defining the addresses of the first and second boundaries.

5. In a system as in claim 1, the second means providing relative fast scan across a line until detecting a pair of boundaries defining beginning and end of a line portion holding an elemental area with contrast information, and storing addresses thereof, the system including means (a) causing the fourth means to operate for providing scan retrace to the boundary address of the beginning of that portion and to provide slow scan to the end address thereof, the system including control means to provide for subsequent detection of the next pair of boundaries.

6. In a system as in claim 5, the system including second control means to operate the third means for providing transmission of the two addressing signals defining the pair of boundaries and to operate the fourth means for providing subsequent transmission of facsimile data scanned from in between the two boundaries.

7. In a system as in claim 6, there being a receiver for the transmitted signals, including first and second register means respectively receiving the two addresses, and including means to increment the content of the first register means as received at the slow scan rate until its content agrees with the content of the second register means, there being means in the receiver to concurrently provide printout in response to facsimile data, concurrently received at said slow scan rate for printout scan in response to the content of the first register means as progressively incremented.

8. In a system as in claim 5, the second means providing relatively fast scan until detecting a first contrast holding elemental area that may be followed by a number of elemental areas without contrast and less than a particular number, followed by a second contrast holding elemental area that is followed by a number of elemental areas without contrast in excess of the particular number, followed by a third contrast holding elemental area on line end, the means (a) providing retrace upon detection of the third elemental area.

9. In a system as in claim 1, the second means providing relatively fast scan of a complete line and including means for storing the signals defining the addresses of all detected boundaries, the system including control means to operate the fourth means to provide slow scan between respective two sequential boundaries as defined by the stored addresses and as defining beginning and end of a block of elemental areas that include contrast information bearing elemental areas, while causing the scanning means to skip over line portions between any respective two sequential boundaries delineating a line portion without contrast bearing elemental areas.

10. In a system as in claim 9, the third means providing transmission of signals representing the addresses of all of the detected boundaries in immediate sequence, the fifth means providing transmission of the facsimile data of all data blocks in immediate sequence subsequent to the transmission of the address signals.

11. In a system as in claim 10, there being a receiver for the transmitted signals including storage means to store the addresses as received, further including means to provide slow printout scan between respective two sequential addresses held in the storage means for printout in response to the concurrently received facsimile signals.

12. In a system as in claim 1, the first means being a sweep counter providing addressing signals, there being a relatively slow clock and a relatively fast clock for respectively providing slow or fast counter incrementing, the line scanning means operated in response to the state of the counter, there being a second counter, connected to count numbers of consecutive elemental areas without contrast information, there being storage means included in the second means, to store the count number associated with detection of a first contrast holding elemental area and to store the count number associated with subsequent detection of a contrast holding elemental area followed by a response of the second counter as to completion counting up to a predetermined count number, the two count numbers respectively defining boundary addresses of a data block on the line that is scanned.

13. In a facsimile system, the improvement for providing for facsimile data compression, comprising:

scan control means providing line scanning of a particular area;

first means coupled to the scan control means to operate the scan control means for scanning at a relatively fast rate;

second means detecting a first contrast holding elemental area along a scanning line and connected to the first means to derive a first address signal therefrom identifying the relative position of that area on said line;

third means detecting a minimum number of consecutive elemental areas along the line without contrast and connected to the first means to derive a second address signal therefrom identifying the relative position of the contrast holding elemental area followed by the first one of said consecutive elemental areas;

fourth means connected for receiving and storing the first and second addressing signals;

fifth means connected for operating the control means at a relatively slow scan in between scanning positions as defined by the first and second addressing signals; and means for providing transmission of the stored addressing signals and of facsimile signals produced during slow scan operation of the fifths and of the scan control means.

14. In a facsimile system:

first means providing manifestation of criteria for subdividing the scanning area into first areas holding information nd second areas not holding information;

second means cooperating with the first means to define addresses delineating the boundaries of the first areas, and including means to provide digital signals representing these addresses;

third means controlled in response to these digital signals to provide facsimile scan and readout within the first areas only; and fourth means connected to provide separate transmission of the address signals and of signals derived from the facsimile scan.

15. In a facsimile system, a facsimile data receiving and reproducing unit for reproducing facsimile data in a particular area, comprising:

means for scanning a document upon which data is to be reproduced;

first means identifying signals as received, as defining boundaries for first areas, holding data and second areas within the particular document being transmitted not holding data to be reproduced;

second means connected to the first means for storing the identifying signals; and third means operating in response to the stored identifying signals to cause said reproducing unit's scanning operation to be restricted to the first areas, holding data only and to skip over the second areas which are not to hold data.

* * * * *